(12) United States Patent
Cozad et al.

(10) Patent No.: US 10,353,353 B2
(45) Date of Patent: Jul. 16, 2019

(54) HYDROCARBON PROCESSING ANALYSIS

(71) Applicant: ExxonMobil Research and Engineering Company, Annandale, NJ (US)

(72) Inventors: Alison Cozad, The Woodlands, TX (US); William A. Docter, Beaumont, TX (US); Joseph W. Evans, McLean, VA (US); Narendranath Y. Gaitonde, Centreville, VA (US); John M. Righi, The Woodlands, TX (US); John D. Terry, Pearland, TX (US); Kenneth H. Tyner, The Woodlands, TX (US); David S. Bergeson, Zachary, LA (US); Henry F. Demena, Naples, FL (US); Katherine L. Weiger, Houston, TX (US); Douglas B. Doughty, Fairfax, VA (US); Anthony M. Ciravolo, Spring, TX (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 182 days.

(21) Appl. No.: 15/278,196

(22) Filed: Sep. 28, 2016

(65) Prior Publication Data
US 2017/0097616 A1 Apr. 6, 2017

Related U.S. Application Data

(60) Provisional application No. 62/236,403, filed on Oct. 2, 2015.

(51) Int. Cl.
*G05B 13/04* (2006.01)
*G06Q 10/06* (2012.01)
(Continued)

(52) U.S. Cl.
CPC ........ *G05B 13/048* (2013.01); *G06F 3/0484* (2013.01); *G06Q 10/04* (2013.01); *G06Q 10/06* (2013.01)

(58) Field of Classification Search
CPC .................................................. G05B 13/048
(Continued)

(56) References Cited

U.S. PATENT DOCUMENTS 7,949,417 B2 * 5/2011 Peterson .............. G05B 13/048
700/28
9,939,548 B2 * 4/2018 Burmester ............... G01V 3/20
(Continued)

OTHER PUBLICATIONS

Panahi, Hamed, et al. "A 4D synchrotron X-ray tomography study of the formation of hydrocarbon migration pathways in heated organic-rich shale." arXiv preprint arXiv:1401.2448 (2014).pp. 149-160. (Year: 2014).*

(Continued)

*Primary Examiner* — Satish Rampuria
(74) *Attorney, Agent, or Firm* — Glenn T. Barrett

(57) ABSTRACT

Tools and methods are provided for supplementing an optimization solution for an objective function based on a model of one or more hydrocarbon refining and/or conversion and/or chemical production processes with supporting analysis. The supporting analysis can illustrate for a user how the nature of the feed(s) and/or the selected processing conditions and/or the quality of the product(s) contributes to the optimized solution. A user interface is also provided to facilitate viewing of the information by a user. The supporting analysis can allow a user to understand the factors in the optimized solution that contribute in a significant way.

7 Claims, 16 Drawing Sheets

(51) Int. Cl.
  *G06F 3/0484* (2013.01)
  *G06Q 10/04* (2012.01)
(58) Field of Classification Search
  USPC .................................................. 700/44–66
  See application file for complete search history.

(56) References Cited

U.S. PATENT DOCUMENTS

| | | | |
|---|---|---|---|
| 2007/0100475 A1* | 5/2007 | Korchinski | G05B 13/042 700/28 |
| 2008/0077257 A1 | 5/2008 | Peterson | |
| 2010/0212909 A1* | 8/2010 | Baumstein | G01V 11/00 166/369 |

OTHER PUBLICATIONS

Chung, Paul WH, et al. "Knowledge-based process management—an approach to handling adaptive workflow." Knowledge-Based Systems 16.3 (2003): pp. 149-160. (Year: 2003).*

Simpson, Gary A., and Neil S. Fishman. "Unconventional tight oil reservoirs: A call for new standardized core analysis workflows and research." International Symposium of the Society of Core Analysts, St. John's, Newfoundland and Labrador, Canada. 2015.pp. 1-12. (Year: 2015).*

Ganesh, N. et al., "A Reduced Hessian Strategy for Sensitivity Analysis of Optimal Flowsheets", AIChE Journal, 1987, vol. 33, No. 2, pp. 282-296.

Kuhn, H.W. et al., "Nonlinear Programming", In Proceedings of the Second Berkeley Symposium on Mathematical Statistics and Probability, 1950, pp. 481-492.

Pirnay, Hans et al., "Optimal sensitivity based on IPOPT", Mathematical Programming Computation, 2012, vol. 4, pp. 307-331.

Zhang, Yale et al., "Results analysis for trust constrained real-time optimization", Journal of Process Control, 2001, vol. 11, pp. 329-341.

Fiacco, Anthony V., "Sensitivity Analysis for Nonlinear Programming Using Penalty Methods", Mathematical Programming, 1976, vol. 10, pp. 287-311.

The International Search Report and Written Opinion of PCT/US2016/054065 dated Nov. 21, 2016.

* cited by examiner

|  | Feedrate | Temp. |
|---|---|---|
| Economic incentives | | |
| Products | -$26.53 | $0.093 |
| Feeds | -$25.86 | $0.115 |
| Utilities | -$0.26 | -$0.007 |
| Subtotal | $0.40 | $0.016 |
| Constraint Impacts | | |
| Ovhd Temp. Limit | -$0.39 | -$0.013 |
| Benzene Limit | -$0.01 | -$0.003 |
| Subtotal | -$0.40 | -$0.016 |

Reading the report:
We can make $0.4 M/d more by increasing feedrate 1 kbbl/d

However, increasing the feedrate 1 kbbl/d is limited by a $0.39 M/d penalty from the Overhead Temperature limit Incentives + Constraint Impacts = 0

$$\frac{dp_1}{dx} + \frac{dp_2}{dx} + \ldots - \lambda_1 \frac{dg_1}{dx} - \lambda_2 \frac{dg_2}{dx} - \ldots - \lambda \chi_{\leq \bar{\chi}} = 0$$

Each term in the above equation corresponds to a cell in the column for independent variable x

FIG. 4

Simplified Constraint Report

|  | Overhead Temp. limit | Benzene purity lim |
|---|---|---|
| Economic incentives | | |
| Products | $2.49 | -$4258 |
| Feeds | -$2.43 | -$4258 |
| Utilities | -$0.02 | -$10 |
| Subtotal | -$0.034 | -$10 |
| Actual Shadow Value | -$0.034 | -$10.0 |

Reading the report:

We have a $0.034 M/d incentive to relax the overhead temperature limit by 1°F. This is due to a products incentive of $2.49 M/d despite a feeds penalty of $2.43 M/d

FIG. 6

Simplified Depth Report

|  | Overhead Temp. limit | Benzene purity limit |
|---|---|---|
| Room to move | 10 °F | 0.0005 |
| Next active constraint | Btms. C3 limit | Btms. Visc. limit |
| Products [$M/d] | $25.79 | -$2.12 |
| Feeds [$M/d] | -$25.23 | $2.12 |
| Utilities [$M/d] | -$0.23 | $0.01 |
| Total profit [$M/d] | -$0.21 | $0.01 |
| Feedrate, kbbl/d | 0.93 | -0.07 |
| Inlet temp., °F | 2.09 | 2.16 |

Reading the report:
If we begin relaxing the overhead temperature, we will be able to increase the limit by 10°F before we hit the next limit: Bottoms C3 purity

Relaxing this limit by 10°F will increase the profit by $0.21 M/d and allow feedrate to increase 0.93 kbbl/d.

FIG. 7

II. Model limit changes $$\min_{F,T} \text{Profit}(F,T) = \text{Prod}(F,T) + \text{Feed}(F,T) + \text{Ut}(F,T)$$

$$\text{s.t.} \quad O(F,T) \leq 700$$
$$O(F,T) \geq 400$$
$$B(F,T) \leq 0.002$$
$$B(F,T) \geq 0.001$$
$$F \leq 15$$
$$F \geq 15$$
$$T \leq 400$$
$$T \geq 600$$

Problem definition for example shown in FIGS. 1 - 7

FIG. 12

$\text{Profit}(F,T) = \text{Prod}(F,T) + \text{Feed}(F,T) + \text{Ut}(F,T)$
$\phantom{\text{Profit}(F,T)} = -0.01\,(F-20)^2 - 0.0001\,(T-575)^2 + 0.0005\,T\,F + 2$ $\text{Prod}(F,T) = F^2 - 0.0001\,T^2 + 0.001\,T\,F$ $\text{Feed}(F,T) = 0.99\,F^2 + 0.4\,F + 0.115\,T - 35.a0625$ $\text{Ut}(F,T) = -0.0005\,T\,F$ $O(F,T) = 38\,F - 0.05\,T\,F + 1.04\,T$ $B(F,T) = (-10\,F + 0.02\,T\,F - 0.01\,T)/100$ Functional forms for variables for example shown in FIGS. 1 - 7

FIG. 13

| Variable | Description | Variable type |
|---|---|---|
| Profit (F,T) | Total profit [$M/d] | Objective |
| Prod (F,T) | Product profit [$M/d] | Objective contribution |
| Feed (F,T) | Feed cost [$M/d] | Objective contribution |
| Ut (F,T) | Utility cost [$M/d] | Objective contribution |
| F | Feedrate [kbbl/d] | Independent |
| T | Inlet temperature [°a] | Independent |
| O (F,T) | Overhead temperature [°F] | Dependent |
| B (F,T) | Overhead benzene purity [fraction] | Dependent |

Table 1: Notation

FIG. 14

Variable description for variables for example shown in FIGS. 1-7

| Variable | Optimal value | Shadow value |
|---|---|---|
| Feedrate | 13 kbbl/d | 0 |
| Temperature | 528 °F | 0 |
| Overhead temperature | 700 °F | 0.034 (M$/d) / (°F) |
| Overhead benzene purity | 0.002 | 10.076 (M$/d) / (fraction) |

Table 1: Optimal solution

Optimized solution for example shown in FIGS. 1 - 7

FIG. 15

First-order KKT condition for each $x$ $$\sum_{i \in [\text{Obj terms}]} \frac{dp_i}{dx} - \sum_{i \in [\text{Constraints}]} \lambda_i \frac{dg_i(x)}{dx} = 0$$

First-order KKT condition for feedrate $$\frac{d\text{Prod}}{dF} + \frac{d\text{Feed}}{dF} + \frac{dUt}{dF} - \lambda_{O^{up}} \frac{dO}{dF} - \lambda_{B^{up}} \frac{dB}{dF} = 0$$

$$26.528 - 25.860 - 0.0264 - 0.034 \cdot 11.6 - 10.076 \cdot 0.00056 = 0$$

First order KKT optimality conditions for example shown in FIGS. 1 - 7

FIG. 16

HYDROCARBON PROCESSING ANALYSIS

CROSS REFERENCE TO RELATED APPLICATIONS

This application claims the benefit of U.S. Provisional Ser. No. 62/236,403, filed on Oct. 2, 2015, the entire contents of which are incorporated herein by reference.

FIELD

An interface and supporting analytical methods are provided for analysis of hydrocarbon processing workflows, such as refinery workflows or chemical production workflows. It is contemplated that the presently disclosed subject matter may be utilized in other manufacturing production workflows that are not limited to hydrocarbon processing or chemical production.

BACKGROUND

Refinery processing of whole crudes involves processes to form multiple products, with each product potentially requiring a separate multi-stage process. Selecting a crude slate for a refinery can require balancing the needs of the various multi-stage processes to improve the overall profitability of the refinery. Due to the large number of potential interactions between a crude slate and the various processes, altering a crude slate to attempt to take advantage of changes in price relationships between crude oil sources can pose significant risks.

Even within a single process train for forming products, it can be difficult to determine whether a variation in process conditions will be beneficial. A process operator may be able to monitor the direct benefits of a process change for a desired product, but a typical process train can also generate a variety of side products. The information to determine whether debits in side products outweigh the benefits to a primary product may not be readily available for a process operator.

U.S. Pat. No. 7,949,417 describes a model predictive controller solution analysis process. The solution from a multivariable predictive controller is analyzed and described by providing quantitative input to operators regarding the effect of changing controller limits on the controller solution. This information allows rapid operator response to changes and more optimal process operation.

SUMMARY

In an aspect of the presently disclosed subject matter, a method is provided for analyzing a solution from a hydrocarbon processing model comprising: generating converted shadow values from an optimized solution for an objective function of a hydrocarbon processing model; displaying a plurality of the converted shadow values; tracking a stream corresponding to at least one displayed converted shadow value to identify related converted shadow values, at least one related converted shadow value being different from the displayed plurality of converted shadow values; displaying one or more identified related converted shadow values; performing sensitivity analysis for an active constraint corresponding to at least one converted shadow value from the displayed plurality of converted shadow values or the identified related converted shadow values; performing constraint relaxation for the active constraint corresponding to the at least one converted shadow value to generate a relaxed optimized solution; and displaying at least one converted shadow value corresponding to the optimized solution and at least one converted shadow value corresponding to the relaxed optimized solution.

In another aspect of the presently disclosed subject matter, a hydrocarbon processing analysis system comprising: a shadow value analyzer for determining converted shadow values based on shadow values and corresponding constraint sensitivities for a plurality of constraints from an optimized solution based on a hydrocarbon processing model; a constraint sensitivity analyzer for determining changes in the optimized solution based on changes in constraint sensitivities for one or more active constraints from the plurality of constraints; a constraint relaxation module for identifying at least one of i) a secondary constraint that becomes an active constraint upon relaxation of a first active constraint from the plurality of constraints and ii) a change in the optimized solution based on a substantial change in a constraint sensitivity for an active constraint from the plurality of constraints; a stream tracker for identifying converted shadow values in the hydrocarbon processing model that are related to a process stream; and a user interface for display of at least one of: a listing of a plurality of selected converted shadow values within the determined converted shadow values, the plurality of selected converted shadow values including a) at least one converted shadow value having a value greater than a first threshold percentage of a sum of the determined converted shadow values, b) at least one converted shadow value having an absolute value greater than a second threshold percentage of the determined converted shadow values, or c) a combination thereof; a listing of converted shadow values related to a tracked process stream, the tracked process stream comprising at least one product; and a listing of converted shadow values related to a selected constraint from multiple optimized solutions.

BRIEF DESCRIPTION OF THE DRAWINGS

FIGS. 1-7 schematically show an example of application of the analysis methods described herein to a hypothetical system, FIG. 8 schematically shows the relationship between a physical system, the corresponding model of the system, and the analysis methods described herein.

FIGS. 12-16 provide additional details regarding the model and optimized solution used for the example illustrated in FIGS. 1-7.

DETAILED DESCRIPTION

Figure 1:
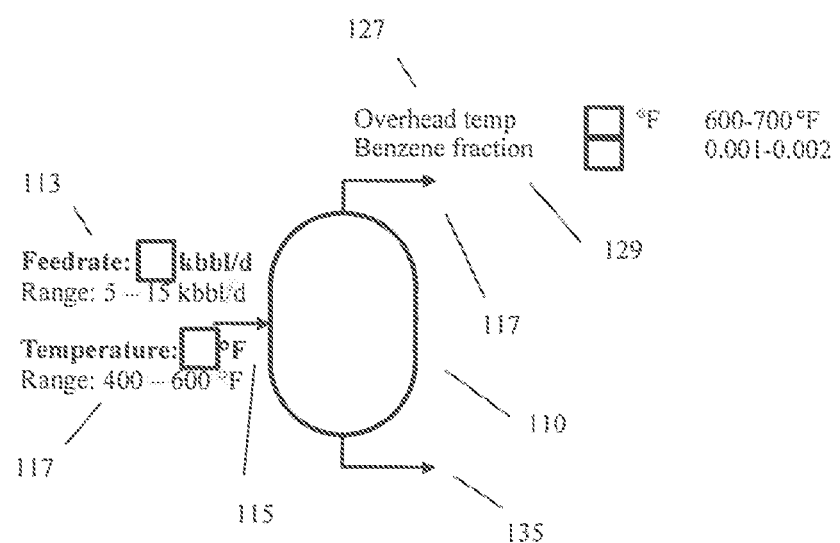

All numerical values within the detailed description and the claims herein are modified by "about" or "approximately" the indicated value, and take into account experimental error and variations that would be expected by a person having ordinary ski in the art.

Overview

In various aspects, tools and methods are provided for supplementing an optimization solution for an objective function based on a model of one or more hydrocarbon refining and/or conversion and/or chemical production processes with supporting analysis. It is contemplated that the previously disclosed subject matter is not intended to be hydrocarbon refining or chemical production processing;

rather, it is intended that the presently disclosed subject matter has application in other manufacturing and production processes. The supporting analysis can illustrate for a user how the nature of the feed(s) and/or the selected processing conditions and/or the quality of the product(s) contributes to the optimized solution. A user interface is also provided to facilitate viewing of the information by a user. The supporting analysis can allow a user to understand the factors in the optimized solution that contribute in a significant way. The supporting analysis can also allow a user to understand the assumptions within the model. This additional understanding can allow a user to implement an optimized solution that may differ from a solution that is expected by the user. This additional understanding can also assist a user in distinguishing between process variables and/or constraints that will provide a substantial benefit when changed versus process variables and/or constraints that will have a limited impact. Alternatively, the additional understanding can assist a user in identifying errors in the model used to form an optimized solution.

In order to account for the multiple interactions present between and/or within processing trains for refining of hydrocarbons and/or hydrocarbon-based chemical production, a multi-variable model can be used to determine an optimized solution for an objective function, such as an objective function for maximizing the profit of one or more refineries; one or more process trains within a refinery; one or more chemical production plants; one or more process trains within a chemical production plant; or a combination thereof. Such an optimized solution can be used in a variety of ways. For example, when crude oils are being purchased to form a crude slate for a refinery, an optimized solution can be used to identify the most favorable crude oils to purchase based on the current price of the available crudes. This can include accounting for how variations in the crude slate may alter refinery operating conditions as well as how resulting product quality may be impacted. As another example, a real-time optimized solution for an individual refinery and/or chemical production process or a group of processes can provide operating conditions for the process(es).

One of the difficulties with implementing an optimized solution is that the solution may differ from an outcome expected by the user. This can present a dilemma to the user. If a user ignores a solution and relies on conventional wisdom, a substantial opportunity for improved operation may be lost. However, if the unexpected solution is somehow based on an incorrect assumption, implementing the solution could be costly. What is needed is a tool that can allow a user to understand the basis for an unexpected solution. To satisfy this need, the tool can allow a user to identify the parts of a solution that make the largest contribution to the unexpected outcome. This can allow the user to make an informed decision about whether to implement the unexpected solution as opposed to staying with more conventional operation.

A tool for understanding the nature of an optimized solution can include various aspects. One aspect can provide an analysis regarding the marginal change in value that would occur due to a small change in feed and/or operating conditions for a hydrocarbon processing facility or a process within such a facility. A second aspect can provide an analysis regarding how potential changes to the model of a hydrocarbon refining/conversion/production process may improve the model and/or may improve the underlying process. These aspects can be illustrated by a user interface that can quickly allow a user to identify the largest impacts on value from the analysis of the optimized solution.

Figure 8:
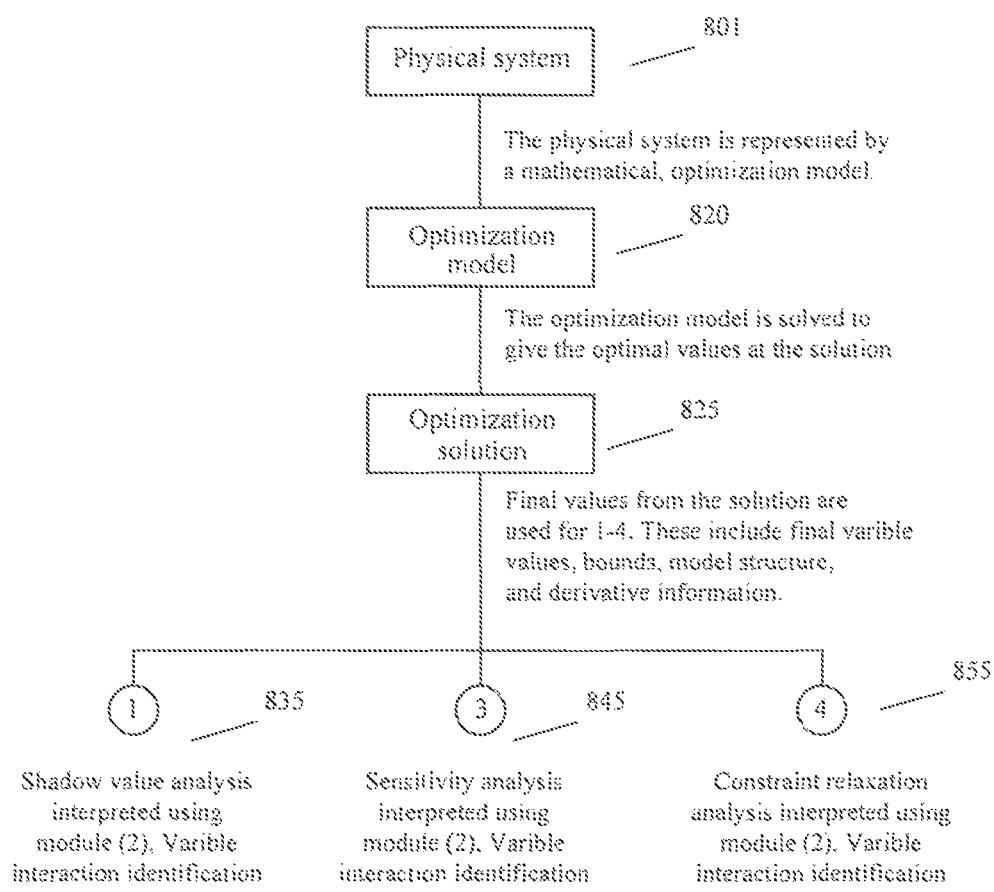

FIG. 8 shows an example of how an optimized solution relates to the analysis tools described herein. As shown in FIG. 8, a physical system 801 can be represented by an optimization model 820. An optimized solution 825 can be developed based on the model. The optimized solution 825 can then be analyzed using shadow value analysis 835, constraint sensitivity analysis 845, and constraint relaxation 855.

This discussion generally relates to tools and methods for analyzing an optimized solution (or solutions) generated from models of hydrocarbon processing systems. The models can be related to individual processes or multiple (optionally related) processes. In some aspects, multiple processes can correspond to processes within a single hydrocarbon processing facility, or the processes can correspond to multiple facilities, including but not limited to models for optimizing an objective across multiple facilities. In this discussion, reference may be made to hydrocarbon processing. Unless specifically noted otherwise, it is understood that hydrocarbon processing generally includes processes typically involved in extraction, conversion, and/or other refining of petroleum, and processes typically involved production, separation, purification, and/or other processing of chemicals based on hydrocarbon or hydrocarbon-like feeds. Examples of processes related to refining of hydrocarbons include any processes involved in production lubricants, fuels, asphalts, and/or other products that can generally be produced as part of a petroleum processing work flow. Examples of processes related to chemicals production include any processes related to production of specialty chemicals, polymers (including production of feeds for polymer production), synthetic lubricants, and/or other products that can generally be produced as part of a hydrocarbon-based chemicals production workflow.

In this discussion, hydrocarbon processing is defined to include processing of and/or production of streams containing hydrocarbons and hydrocarbonaceous or hydrocarbon-like compounds. For example, many mineral petroleum feeds and bio-derived hydrocarbon feeds contain substantial quantities of compounds that include heteroatoms different from carbon and hydrogen. Such heteroatoms can include sulfur, nitrogen, oxygen, metals, and/or any other type of heteroatom that may be found in a mineral petroleum feed and/or bio-derived hydrocarbon feed. As another example, some chemical production processes involve reagents corresponding to alcohols and/or other organic compounds that contain heteroatoms other than carbon and hydrogen. Still other refinery processes and/or chemicals production processes may involve production of products that are not hydrocarbons, such as reforming processes that convert hydrocarbon or hydrocarbon-like compounds to generate hydrogen, water, and carbon oxides as products. Yet other processes may form hydrocarbon or hydrocarbon-like compounds from reagents such as hydrogen, water, and carbon oxides. It is understood by those of skill in the art that all of the above types of processes are intended to be included within the definition of hydrocarbon processing in this discussion, Technical Effect The analysis tools and supporting user interface described herein can substantially improve a user experience when attempting to understand an optimized solution based on a hydrocarbon processing model. The analysis tools, either alone or in combination, can simplify review of relevant data by a user. This can include conversion of model values to readily understood quantities for a user (such as prices or stream values), as well as reducing the amount of information displayed at a single time to a manageable size. This can also include facilitating comparison of results from multiple optimized solutions.

The analysis tools described herein can also improve operation of a hydrocarbon processing model by allowing a user to identify potential errors in the model, such as relationships between variables that are not present in the underlying physical system. These erroneous relationships can be identified, for example, based on stream tracking for the shadow values generated by the analysis tools. This represents an improvement in the operation of a computer.

Modeling of Hydrocarbon Processing Facilities and Processes

The analysis tools described herein correspond to tools for analyzing an existing "optimized solution" for operation of a hydrocarbon processing facility (such as a refinery or chemicals production plant) and/or for operation of one or more related process trains in a hydrocarbon processing setting.

In general, a model of the operation of a hydrocarbon processing facility and/or a hydrocarbon processing reaction system can involve variables, coefficients, and constraints. The variables within a model can correspond to independent variables or dependent variables. Independent variables represent features of the hydrocarbon processing model that can be independently adjusted without directly altering the value of another independent variable. Such features can include, but are not limited to, features of an input feed (e.g., crude oil or crude slate, reagent feed and/or operating conditions for various processes within a processing facility (e.g., operating conditions for distillation processes, catalytic processes, solvent separation processes, thermal cracking processes, synthesis processes, purification processes, and other types of processes.) In some instances products and/or product specifications may correspond to independent variables. It is noted that independent variables may have indirect interactions with other independent variables due to constraints on the model.

Dependent variables correspond to variables (features) that are directly related to at least one independent variable so that changes in the independent variable(s) result in changes in the dependent variable. The direct relationship with the independent variable(s) can have any convenient functional form. Dependent variables may also have indirect interactions with other independent and/or dependent variables due to constraints on the model. Dependent variables can include, but are not limited to, features related to amounts present in streams emerging from a modeled process within a processing facility and properties of products and/or intermediate flow in streams within a processing facility.

Constraints within a model of refinery operation can correspond to practical limits on an independent or dependent variable based on the underlying refinery process (or processes) that are being modeled. These constraints are typically incorporated into the model as an inequality constraint expression for an independent or dependent variable. Constraints can represent, for example, a minimum or maximum stream input requirement for a process; a minimum or maximum value for a particular aspect of a product quality; a minimum or maximum value for an operating condition for a process; and/or any other value that represents a practical and/or physical requirement for refinery operation that is desired for representation in the model.

In this discussion, constraints can be considered as active or inactive. An "active" constraint corresponds to a constraint where the constraint expression is at a boundary. For example, consider a process condition that should have a value between 1 and 5 for the underlying physical process. This can be modeled as a pair of inequality constraints, with a first constraint expression corresponding to $1 \leq z(x)$ and a second constraint expression corresponding to $z(x) \leq 5$. When the value of $z(x)$ in an optimized solution based on the model is either 1 or 5, the constraint expression is at a boundary corresponding to one of the two specified inequality constraints, and the constraint is considered to be an "active" constraint. When a constraint is active, the corresponding shadow value for the constraint will be non-zero. An "inactive" constraint corresponds to a constraint with a constraint expression that is not at a boundary value. An inactive constraint will have a corresponding shadow value of zero.

Shadow values within a model represent an additional variable associated with a constraint. The shadow value variables are determined as part of the optimized solution. During analysis of an optimized solution, shadow values can serve as a weighting factor for a constraint relative to other constraints in the optimized solution.

Coefficients within a model can represent relative values of the different variables and constraints, no that desired relative weightings can be assigned to various features and/or constraints within the model. Coefficients can represent costs, values, bounds, and/or other relationships between variables and/or constraints in the model.

To model one or more hydrocarbon processing facilities and/or one or more processes within a hydrocarbon processing facility, a model can be developed to represent the various aspects of a facility and/or process that are believed to be relevant. In addition to setting up variables, coefficients, and constraints to represent the various processes within a facility (or facilities), a slate of input feeds and/or a state of output products can also be specified. The slate of input feeds can include any crude oil and/or other hydrocarbonaceous feeds that might be used to form one or more streams within a hydrocarbon processing facility. The slate of output products can include both desired products such as lubricants, fuels, chemicals) as well as side products or waste products (such as fuel gas, sulfur, coke). It is noted that a "product" such as sulfur might actually correspond to an additional cost for disposal as opposed to providing additional profit.

For models of facility operation (such as refinery operation), the scope of the model can correspond to a single facility or multiple facilities. Depending on the nature of the model, the model can capture costs and benefits related to a) the crude oils, crude oil slates, and/or other feed sources that are used as inputs for processing at one or more hydrocarbon processing facilities (e.g., refineries, chemical production plants) that are represented within a model; b) costs and benefits related to the operations of various processes within a model, including distillations, hydroprocessing, thermal (optionally catalyzed) processing, synthesis reactions, conversion reactions, separations and purifications, and/or other types of processes that occur within a hydrocarbon processing facility; and c) costs and benefits related to products formed from the hydrocarbon processing facilities, including both primary products, secondary or side products; and/or waste products (such as products that have a cost associated with disposal). Determining a solution to a model of facility operation can be used to indicate types of crude oil (or other input streams) to purchase for processing depending on the costs of the crude oil, the value of the resulting products, and/or any limitations of the facility (or facilities) in handling the input feeds.

For real-time optimization models, the scope of the model can correspond to one or more process trains within a hydrocarbon processing facility, such as a plurality of process trains that are related based on using overlapping portions of a feed, using overlapping equipment, and/or providing complementary products. A typical example of using overlapping portions of a feed are refinery processes that receive input feeds from a common distillation unit (such as an atmospheric or vacuum pipestill), so that modifying the distillation cut points to benefit a first process can also lead to a modification of the feed for a second process.

Due to the significant interactions within hydrocarbon processing facilities and the markets in which they operate, the incentive for optimization across an entire refinery/chemical production plant and even across multiple refineries/production plants can be significant. A first step toward capturing that incentive can be the use of optimizable refinery and circuit models. Optimizable Refinery Models (ORMs) rely on engineering, mathematics and business information, and produce solutions that can lead to significant operational advantages. Although referred to as optimizable refinery models, it is understood that ORMs can be equally applied to other types of hydrocarbon processing facilities. Similar advantages can potentially be realized on the scale of individual process train(s) by performing real-time optimization of processes within a hydrocarbon processing facility. Real-time optimizers (RTO) can automatically set operating targets based on current plant conditions and pricing strategies. However, many of the optimization solutions generated from models or optimizers may correspond to solutions that conflict with the expectations of a user. If a non-intuitive optimization solution is to be utilized and thereby achieve the operational advantage indicated by a model, methods are needed to allow the user of to better understand the optimized solution and/or to allow the user to trust that the business context and technical basis of the solution are appropriate.

Attempts to use economic optimization for (multiple) processing facility operations and/or real-time optimization for processes within a facility can present a unique set of challenges. Some of these challenges can be grouped into problems that are (a) inherent to the optimization problem and (b) tied to the systems, work processes, and software used to run the optimization. Challenges inherent to the optimization problem can include handling non-intuitive solutions and handling high-dimensional data. Challenges arising due to work processes and software can include validation of the input used to arrive at an optimized solution and sustainability of optimized solutions. Still a further challenge can be resolving questions regarding an optimized solution on a time scale that allows the user to take advantage of new strategy while the opportunity still exists and/or before substantial losses have been incurred.

Non-intuitive solutions. These may indicate unexpected but profitable operating regions or deficiencies in the underlying models. Many layers of complexity are involved in every solution, which may not be easily interpreted into operational terms.

High-dimensional data. ORM problems can have thousands or (even hundreds of thousands) of variables and constraints. Finding a consistent explanation is complicated by hundreds of streams, stream qualities, and their variation based on crude (or other input feed) selection and unit operations.

Input validation. Data sets may be very large and rely on data from many sources. The user who runs the model may not have knowledge of all of the constraints at the site and must constantly verify the many underlying assumptions in the model.

Sustainability. As business contracts, equipment condition, and maintenance change system parameters, the model must change to reflect the correct incentives. Any change to the models, assays, or stream dispositions requires testing to ensure that interactions with other parts of the site and circuit don't lead to useless solutions.

In order to address the above challenges, one or more analysis tools can be used to guide a user in understanding the nature of an optimization solution for a hydrocarbon processing facility model. One aspect of the model can correspond to providing an analysis of marginal values or "shadow values" in the model, including combinations of shadow values with corresponding constraint sensitivities. A shadow value multiplied by a constraint sensitivity with respect to a given independent variable is referred to herein as a converted shadow value. A constraint sensitivity can correspond to a change in a constraint value with respect to a unit change in the independent variable (mathematically similar to a derivative of the constraint with respect to the independent variable). The shadow values roughly correspond to the slope of a modeled solution when a derivative is taken with respect to a given constraint. When a shadow value is combined with a corresponding constraint sensitivity, the resulting converted shadow value can serve as an indicator of the marginal increase or decrease in profit when a unit change is made with respect to a selected variable.

Another potential aspect of model analysis can relate to constraint sensitivity analysis. In constraint sensitivity analysis, rather than focusing on the change in value due to a unit change in an independent variable, the change in value due to a unit change in a constraint boundary is determined. Mathematically, this is similar to taking a derivative of the solution with respect to the function representing the constraint. Practically, this calculation can be performed based on the values determined while calculating an optimized solution for the model.

Still another potential aspect of the model analysis can relate to constraint relaxation. During constraint relaxation, a specified constraint can be increased/decreased by a desired amount, or a constraint can be entirely removed. Relaxing a constraint can allow the value of the constrained quantity to vary (either increase or decrease) until either the new constraint expression is satisfied or another constraint limits further changes. For example, if a maximum temperature constraint is relaxed (such as by removing the constraint) for a temperature based separation or distillation, the temperature constrained by the relaxed constraint can be increased until another constraint prevents further increases, such as a constraint on the amount of a stream produced by the temperature based separation or distillation.

Shadow Value Analysis

In various aspects, shadow value or marginal value analysis can be used to further understand the nature of an optimized. Shadow value analysis is an analysis based on having an existing optimized, such as a solution that provides a maximum profit for refinery operation (or operation of another hydrocarbon processing facility) based on a specified availability of crude oils within a crude slate (or availability of input feeds) and/or a specified product slate. The shadow value analysis can be used to provide insight regarding the impact of small changes in the streams within a processing facility on the resulting profit.

Shadow value analysis is based on objective terms, variables, and constraints that are involved with constraint (inequality) expressions that are at a boundary value (i.e., an active constraint). An optimized solution can represent (for example) the maximum profit that can be achieved when operating a hydrocarbon processing facility having a set of processes A to process a set of input feeds B in order to make a set of output products C. Hypothetically, if the optimized solution were to result in a solution with no active constraints, this would indicate a true maximum in the profit, so that no further change based on features already in the model would result in an improved value. Such hypothetical unconstrained solutions are rare.

More typically, at least one constraint is active in an optimized solution. When a constraint is active, so that the corresponding constraint expression is at a boundary value in the optimized solution, this is an indication that at least one variable would have a different value in the optimized solution absent the presence of the constraint. The derivative of the objective function with respect to the active constraint can provide an indication of how the constrained variable contributed to the overall maximum value (such as profit) in the optimized solution. This derivative corresponds to a shadow value or marginal value contribution of the constraint in the maximized value.

Another way of viewing the shadow value is that the shadow value, when combined with a sensitivity of the constraint relative to a given independent variable to form a converted shadow value, represents the change in the maximized value (profit) that would occur if an additional unit of the independent variable was added or removed. In this discussion, an additional "unit" for an independent variable can correspond, for example, to an amount of change that would occur if an additional barrel of the crude oil corresponding to the independent variable is processed by the refinery (i.e., an increase in feed rate). Because a barrel of oil is typically fractionated, the variation due to a barrel of oil for an individual constrained variable might correspond to a fraction of a barrel for the stream directly related to the constrained variable.

More generally, shadow value analysis can take as input a complete or partial list of independent variables, the objective variable, the active constraint list, marginal values, shadow values, constraint values, and select sensitivity values. The shadow value analysis can compute the component terms of the optimality conditions, including the converted shadow values (shadow value multiplied by constraint sensitivity) for selected active constraints and/or each active constraint in the optimized solution. The component terms of the optimality conditions are grouped per independent variable then further categorized as objective or constraint contributions. For each independent variable, the result is an organized list of contributions, where the sum of said terms is equivalent to the marginal value of the corresponding independent variable.

In some aspects, it can be advantageous to have an objective function with a function form where the shadow values correspond to coefficients in the objective function. Equations (2), (3), and (4) show an example of this type of objective function.

$$Value_{crude} = \sum_{stream\ i} (Yield_i)(Value_i) + \sum_{capacity\ i} (Capacity_i)(SV_i) + \quad (2)$$
$$\sum_{Other\ Constraint\ i} (OtherConstraint_i)(SV_i) +$$
$$\sum_{stream\ i}\sum_{property\ j} (SV_{i,j})(yield_{crude,i})(property_{crude,i,j} - property_{i,j})$$

$$Value_{crude} = Price_{crude} + \sum SV_{crude} \quad (3)$$

$$SV_{bound} = \frac{\delta(ObjectiveFunction)}{\delta\ bound} \quad (4)$$

In Equations (2), (3), and (4), streams i can be defined in any convenient manner. One option can be to define streams i based on the eventual product streams that are formed, with such streams being a product in a quantity Yield as shown in Equation (2). Another possibility can be to define streams i based on the streams formed from an initial fractionation of the input feeds into the refinery. Still other potential definitions for a stream i will be apparent to those of skill in the art, such as definitions based on selecting a stream from an intermediate location in a process flow and working both backwards and forwards. It is noted that the value for a stream may be negative, to reflect the nature of some side product or waste product streams. For each stream the stream can be traced back from the products to the original input feeds and/or forward from the input feed to the products through the various fractionations and/or other processes a stream is exposed to.

In addition to the value generated by the Yields of the various product streams i, the objective function described in Equations (2), (3), and (4) also includes various constraint terms. In order to provide an example of a type of constraint, one constraint term in Equation (2) corresponds to "capacity" terms. Within a refinery (or other hydrocarbon processing facility), various processes can have requirements for either minimum amounts of input and/or output flow or maximum amounts of input and/or output flow. Such input and/or output constraints can be represented as capacity constraints. As for any constraint, a capacity constraint that is inactive has a corresponding shadow value of zero, while active constraints will have a non-zero value. It is possible, but unlikely, that an active constraint could have a zero value after rounding, but practically the shadow value of an active constraint will effectively always have a non-zero value, even if the non-zero value is arbitrarily small.

Any other constraints can also be represented in the model, such as constraints on operating conditions for processes, can also be included as shown by the sum for Other Constraints. Additionally, constraints based on desired properties of products can be represented in the model.

It is noted that, as shown in Equation (3), the sum of the various shadow values represents the difference between the Value of a crude and the Price of a crude. In other words, the sum of the shadow values should represent the difference between the Value (profit) of a crude and the initial Price of the crude for the optimized solution. Similarly, if a product in the model is the marginal disposition for the component, the product price adjusted for properties will be the value of the component.

An example of optimality equations for use in modeling refinery operations and arriving at an objective function can be equations for determining reduced costs/marginal values and first-order Karush-Kuhn-Tucker (KKT) conditions, to define the variable interactions as optimal tradeoffs. Optimality conditions, like reduced costs and KKT conditions are made up of one optimality equation per independent variable that needs to be satisfied at the solution. Each optimality equation is the sum of terms associated with each objective term and each constraint. An additional explanation of reduced costs and first-order KKT conditions is included in the final section of this discussion.

These conditions are necessary to define and prove an optimal solution. In current practice, linear optimization users interpret reduced costs, or linear optimality conditions, to show what constraints push the variable upward or downward. This mechanism will not work for typical nonlinear problems and is not very useful for large models. The shadow value analysis tool described herein can advance this interpretive practice to overcome these limitations by (a) analyzing nonlinear optimality conditions and (b) laying out these equations in a tabular format where terms corresponding to like variables are side-by-side, which we expand in (2). This takes a typical one-dimensional analysis of the solution into the full-dimensional space of the problem such that insights become clear to the user. Conversely, the shadow value analysis tool can limit presentation of data to values that are of potentially greater interest to the user, so as to avoid presenting volumes of data beyond a user's ability to interpret.

It is noted that the results from shadow value analysis of optimized solutions can be compared between solutions. For example, if a modification is made to a model, converted shadow values from an optimized solution generated before the modification can be compared with converted shadow values from an optimized solution generated after the modification. This can allow for further investigation of the impact of making changes to an input/constraint/product/other change for a modeled process.

Stream Tracking

Once the shadow values are decomposed into converted shadow values i.e., by multiplying shadow values and corresponding constraint sensitivities), stream tracking can be used to identify the converted shadow values related to a stream. For example, in an aspect where the streams i are defined based on a set of initial crude oils forming the input feed (or alternatively based on the streams formed in an initial fractionation), stream tracking can apply a heuristic to the model equation to find downstream units that are impacted by stream properties. Identifying the units in the objective function that are related to a stream can allow the converted shadow values related to a stream to be displayed together for ease of analysis. Additionally or alternately, stream tracking can use mathematical heuristics to identify which downstream units are impacted by a stream property. Such stream tracking can compare terms in the stream's equations. The largest value variables (for example) can then be followed as they interact in other sub-models, with the path of the largest impacts being displayed to the user.

Another benefit of stream tracking is that stream tracking can identify variables that are indirectly related in a model. This can provide insight into unexpected interactions, or this can highlight interactions that are erroneously present in the model so that the model can be improved to better reflect the modeled system.

More generally, the converted shadow values can be organized into any number of convenient groupings for display to a user during analysis. Options for organizing converted shadow values can include, but are not limited to, grouping values by stream; grouping values based on the largest shadow value contributions to the profit; grouping positive values and/or negative values; or combinations thereof. An example of a combination can be identifying the 5 largest positive (or negative) shadow values and then grouping each of the largest values with other values in the same stream.

When grouping converted shadow values based on the magnitude of the value, any convenient method can be used for determining converted shadow values with a sufficiently high magnitude. One option can be to define a threshold that corresponds to a percentage of the total contribution from all converted shadow values to the quantity being maximized (such as price). In this option, any converted shadow value that is larger than threshold percentage of the combined converted shadow values can be selected for display. For example, converted shadow values corresponding to more than 1% of the combined total of the converted shadow values, or more than 5%, or more than 10% could be selected. Another option can be to define a threshold based so that the largest 1% of shadow values are selected for initial display.

Performing a shadow value analysis and organizing the results as described above can allow users to interpret the tradeoffs that occur in finding an objective function solution. Shadow value analysis quantifies variable interactions to the user on the same basis as the optimization solver. For an economic objective, this results in monetized variable interactions. To this end, the methods and tools described herein systematically break down the equations or conditions that are needed to define the optimal solution. In doing this, the user is provided with a comprehensive view of all the interactions among the objective function terms, the degrees of freedom, and the active constraints.

Constraint Sensitivity Analysis

In various aspects, an optimized solution can also be analyzed relative to the active constraints for the solution. This can be similar to a shadow value analysis, but instead of evaluating a change (e.g., a derivative) due to a unit change in an independent variable (such as increasing a feed or product amount), the evaluated change can correspond to a unit change in a constraint boundary value. Additionally, analysis of an optimized solution relative to a constraint can be performed for a portion of the optimized solution, as opposed to requiring analysis to be performed on the entire solution.

Constraint analysis can provide a different type of insight relative to shadow value analysis. Shadow value analysis can be useful for understanding why changes in feed composition and/or changes in product definitions lead to higher or lower overall value from a refinery or refinery process. Constraint analysis, by contrast, can be useful for determining the value of relaxing a constraint, either by changing the bounding value in a constraint expression or by entirely eliminating the constraint.

As an example, a model for a heavy oil processing system may include one or more constraints related to operation of a coker, such as a minimum fractionation temperature for a fraction that is delivered to the coker or a maximum amount of light ends production from the coker. The relative importance of such constraints may vary depending on the nature of the refinery and/or the refinery process. A constraint analysis may show that a large benefit can be obtained from a small relaxation of one of the coker constraints. Identifying this large benefit can allow a user to consider the importance of the identified constraint, which can allow for altering the constraint to improve operation of the process.

Although constraint analysis is performed on constraints instead of independent variables, constraint analysis can otherwise operate in a manner similar to shadow analysis. Conceptually, the constraint analysis can be based on a derivative of the optimized solution with respect to the constraint (as opposed to an independent variable). Stream tracking can be used to identify other converted shadow values/constraint relaxation values that are related to a give constraint value by a stream.

In Constraint Sensitivity Analysis, the optimal sensitivity of problem variables to changes in active bounds can be determined. To accomplish this, the sensitivity of the independent variables, x, to shifts in the active constraints can be calculated. This method follows the techniques described in Fiacco 1976 for nonlinear optimal sensitivity analysis. The instantiation of this method is accomplished by solving the following Equation (6) for the constraint sensitivities, $$\begin{bmatrix} \nabla_x^2 L(x, \lambda) & \nabla_x^T g(x) \\ \nabla_x g(x) & 0 \end{bmatrix} \begin{bmatrix} \nabla_{\lim} x \\ \nabla_{\lim} \lambda \end{bmatrix} = \begin{bmatrix} 0 \\ I \end{bmatrix} \quad (6)$$

where $L(x,\lambda)$ is the augmented Lagrange function (see later section for Lagrange function description). For convenience, the constraint expression $g(x) \leq 0$ is introduced for each limit, without loss of generality, to describe all constraints or bounds on variables. For example, an upper and lower bound on a dependent variable can be written as $z(x)-z^{up} \leq 0$ and $z^{lo}-z(x) \leq 0$, respectively. In effect, Equation (6) identifies the path the optimal solution will take given local perturbations of each active bound (subscript lim) individually.

Equation (6) produces the derivative of the independent variables to active constraints. This sensitivity is further exploited to calculate the remaining sensitivities of problem variables using the following Equation (7).

$$\nabla_{lim}[\text{Problem variable}] = \nabla_{lim} x \cdot \nabla_x [\text{Problem variable}] \qquad (7)$$

Constraint Relaxation Analysis

In various aspects, after identifying a potential constraint that with a favorable sensitivity, the constraint can be relaxed to allow for greater variation in variables prior to reaching the constraint boundary and/or so that any variables subject to the constraint can be modified until another constraint is encountered.

One method for performing constraint relaxation could be to select a constraint expression for change (including elimination) and then using the original solver to develop a new solution. However, this method for investigating constraint relaxation can be time consuming. A more streamlined method for performing constraint relaxation can be to define a simplified model having a quadratic objective function and linear constraints. The same Hessians and sensitivities generated from the original model can then be used to solve the simplified model with one or more relaxed constraints. Each constraint can either have a modified boundary value or can be entirely removed.

Using a simplified model for constraint relaxation can allow a large number of constraints to be relaxed while using only a small fraction of the computer resources needed for generating an optimized solution using a full model. This can allow various relaxations to be performed with a single constraint and/or with combinations of restraints, in order to investigate the magnitude of relaxation that can occur before another constraint is triggered. It is noted that the constraint sensitivity analysis described above can be performed using constraint relaxation with a small (unit) size change in the constraint.

In addition to determining the value of relaxing a constraint, the ability to identify a nearby constraint can be valuable for determining whether a nearby constraint performs a similar function. If relaxing a first constraint results in another constraint becoming active almost immediately, then relaxing the first constraint is unlikely to provide a substantial benefit regardless of any converted shadow values and/or constraint sensitivities that might be calculated.

The combination of shadow value analysis, constraint sensitivity analysis, and/or constraint relaxation can allow a user to investigate an optimized solution for a model in a variety of ways. For example, if a user encounters a counterintuitive solution, he or she can investigate the optimality definitions using shadow value analysis, to understand why a variable is at a particular level. The high-dimensional space of the problem is reduced to the information that is of interest to the user. Then it can be displayed for manual and automated variable tracing using a user interface. This may point to one or more constraints that affect the variable of interest. These can be investigated further using constraint sensitivity analysis. Presented through the user interface, the sensitivity analysis will show how the constraints will affect the problem when relaxed.

The final step in this thought exercise is to understand how far that constraint can be relaxed before there is no benefit to do so using constraint relaxation. This gives a user an understanding of how far each variable will move when this constraint is removed in addition to the list of other constraints that will allow the variable of interest to move. Again, this information is readily available for filtering and cross-comparison in the user interface.

Constraint Redundancy Analysis

In various aspects, the presently disclosed subject matter may be used to identify constraint redundancy. In particular, it aids in finding constraints that may redundant and/or nearly parallel. When a solution where one constraint is active is nearly identical to the solution where another constraint is active, there is an implication that the constraints may be redundant or parallel. This may lead to unexplained variations in the solution values and shadow values due to the activation of one constraint or the other and may necessitate further investigation. These two nearly redundant constraints are typically physically linked in the process. For example, a problem may have constraint redundancy in a stream temperature and pressure limit. For this case, it might be clear to a user that these two limits may be redundant and cause solution noise. However, there are many cases where this is not obvious. Using these analysis methods described, a user can identify a set of constraints that may be redundant and nearly parallel. The user can then take steps to remove this redundancy.

Project Definition Analysis

In various aspects, the analyses disclosed above may also be used for near, medium, and long term project definition. These analyses are used to define a seriatim of constraints that should be relaxed ranked by the benefit of relaxing them. The benefit can be seen as the objective, economics, the increase or decrease of a variable of interest, increased process throughput, etc. Addressing a particular constraint can be viewed as a near term project, a medium term project and a long term project. For near term project definition, the constraints may be pinched inside of approved limits such that the quantified benefits calculated by these analyses are used to defend the stance that the constraint should be relaxed. For medium term project definition, the constraint relaxations require one or more approvals to be accepted. Alternatively, these constraints may require maintenance to be performed on the process to relax (e.g. heat exchanger cleaning, units repairs, etc.). For long term project definition, the constraints require a longer term project to relax. Constraints may be found because a pump is undersized, a new heat exchanger is needed, a larger compressor is needed, etc. For these cases, the economic benefit is just a starting point for aiding the project design. Understanding how these larger changes will affect the process throughput and key process variable is crucial to the project definition and execution.

User Interface

In some aspects, the results from the analysis tool can be displayed in a user interface to facilitate user review of the analysis. A variety of display methods can be used. For example, an initial interface can display a listing of the largest converted shadow values for each independent variable, or alternatively a listing of largest converted shadow values across all independent variables and/or constraints. The initial number for display can be any convenient number.

From the initial display, a user can investigate the analysis in a variety of ways. One option can be to view variables that are identified as related based on stream tracking. Another option can be to perform further investigation of one or more constraints identified from the shadow value analysis. Still another option can be to perform constraint relaxation on one or more identified constraint. It is also possible to identify constraint redundancy.

Part of the benefit of the user interface can be based on the ability to use stream tracking to display additional information regarding variables and/or constraints based on stream relationships within the model. In addition to allowing data to be organized by stream, this can allow unexpected relationships between variables to be identified and displayed.

Additionally or alternately, the user interface can be used for comparison of converted shadow values from two or more optimized solutions and/or converted shadow values from an optimized solution and one or more constraint relaxation scenarios.

Each time a user requests display of new information, the displayed information can be limited to a manageable amount. Optionally, new information can be displayed side-by-side with the information that was viewed and selected in order to bring up the display of the new information.

EXAMPLE 1

Application to Individual Refinery Process (Prophetic)

FIGS. 1 to 7 illustrate various aspects of applying the data analysis tools described herein to a hypothetical example of a refinery process. In this hypothetical refinery process, an input stream is reacted in some manner, with the reaction products resulting in an overhead stream and a bottoms stream. The process illustrated in FIGS. 1 to 7 is not believed to correspond to an actual refinery process, and instead is provided in an effort to illustrate use of the data analysis tools using a simplified example.

FIG. 1 shows the basic configuration of the process. In FIG. 1, a reactor 110 receives an input feed 115 that is constrained to have a temperature 117 (independent variable) between 400° F. and 600° F. The feed rate 113 is also constrained to have a feed rate (independent variable) between 5 and 15 kbbl/day. Other constraints may also be present, but the other constraints do not become active in this example. The reactor 110 produces two output streams. A first output stream corresponds to an overhead stream 125. The overhead stream 125 is constrained in at least two ways. First, the overhead stream is constrained to have a temperature 127 (dependent variable) between 600° F. and 700° F. Second, the overhead stream 125 is constrained to have a benzene content 129 (dependent variable) of between 0.001 and 0.002 vol %. (Other constraints may exist but do not become active in this example.) Reactor 110 also produces a bottoms stream 135. Bottoms stream 135 is constrained based on having a $C_3$ content ($C_3$ purity dependent variable; not shown) of less than a maximum amount. (Other constraints may exist but do not become active in this example.) In FIG. 1, an optimized solution has not yet been calculated, so open boxes are shown for the values of the variables related to feed rate 113, feed temperature 117, overhead temperature 127, and overhead benzene fraction 129.

In addition to the process configuration, the input stream 115 to be delivered to the reactor 110 can be specified. The input stream 115 can correspond to a crude oil/fraction of a crude oil, or the stream can correspond to an output from another refinery process. In this example, constraints are specified for the output streams 125 and 135, but the nature of the product in output streams 125 and 135 is not otherwise specified. In other applications, such as formation of lubricant or fuel products, a yield of a desired product could be specified as another constraint on the model.

Figure 2:
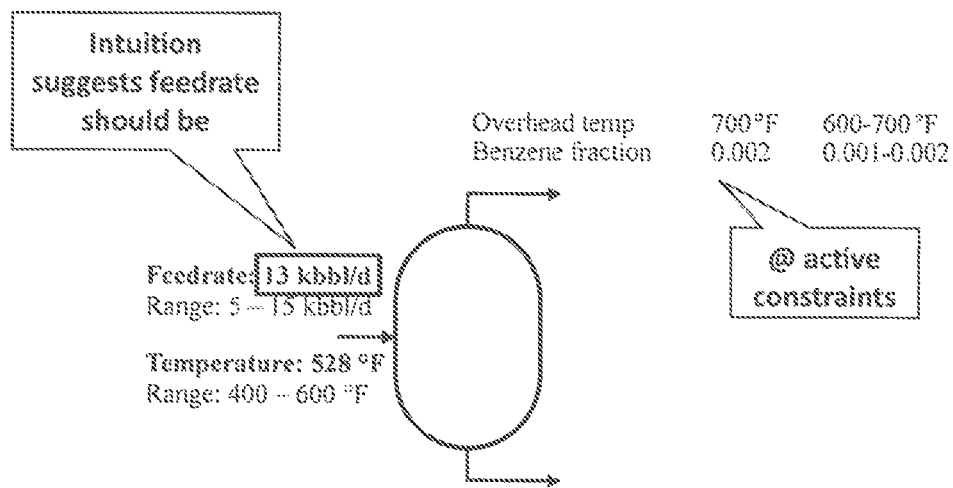

A model of the process shown in FIG. 1 can be generated as described herein. A solution corresponding to an objective function that maximized profit can be determined based on the model. FIG. 2 shows the values resulting from the objective function. As shown in FIG. 2, in the optimized solution the input feed 115 is delivered at a feed rate of 13 kbbl/day and at a temperature of 528° F. The overhead stream is at the maximum temperature of 700° F. and at the maximum benzene concentration of 0.002 vol %. The $C_3$ purity (not shown) is below the maximum value. Based on the optimized solution, the feed rate, feed temperature, and $C_3$ purity are inactive constraints, as none of these constraints is at a boundary value. The overhead temperature and overhead benzene content are both active constraints for the optimized solution. As shown in FIG. 2, the optimized model shows that operating at the optimized conditions results in a net profit of 4.72 million dollars per day.

In this prophetic example, an unexpected outcome is the presence of a feed rate that is less than the maximum of 15 kbbl/day. Intuitively, one might expect that performing the process on a greater amount of feed would result in a greater amount of profit. In order to understand why a feed rate less than the maximum feed rate was selected, the analysis tools described herein can be applied by a user to analyze the optimized solution.

A first tool that can be applied by the user is a shadow value analysis tool. This analysis tool can show the marginal value for changes in an independent variable in view of any constraints. In this example, investigation of a change in the feed rate 113 is shown, but shadow value analysis can also be performed for any and/or all other available independent variables.

Figure 3:
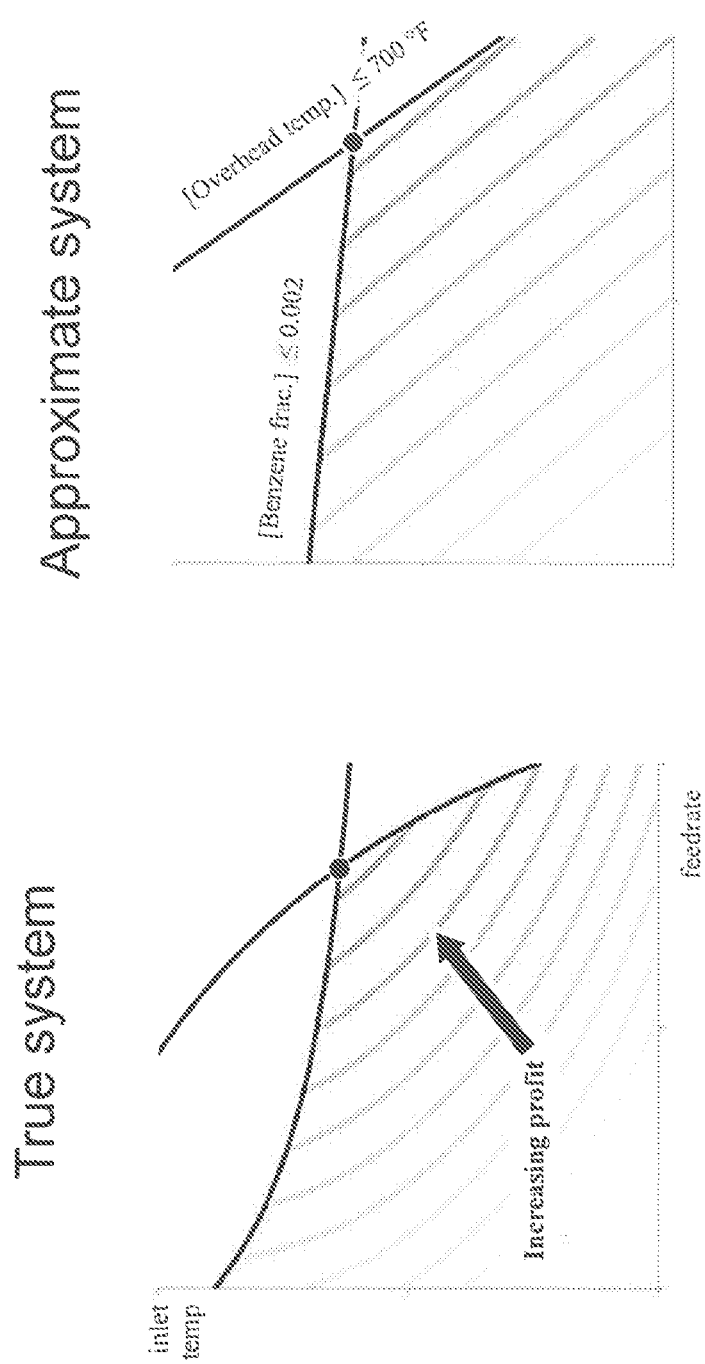

FIG. 3 schematically shows an example of how shadow value analysis can relate to the actual behavior of a model. In FIG. 3, the left hand figure shows the actual shape of the constraints related to benzene content and overhead temperature on a plot of profit as a function of inlet temperature and feed rate. Of course, in other examples many more variables and constraints can be present, leading to a surface of higher dimensionality. The right hand figure shows the approximation based on shadow value analysis where a linear slope value determined by taking a derivative is used as the shadow value. As shown in FIG. 3, shadow value analysis can provide information about the local behavior of how a constraint impacts a constrained variable. As shown in FIG. 3, both benzene fraction and overhead temperature are active constraints for feed rate. This leads to an intersection of the benzene fraction and overhead temperature curves as the constrained value for the feed rate.

FIG. 4 shows an example of the shadow value analysis for the optimized solution. Because the analysis is being performed on an optimized solution, the total of the combined incentives plus the combined constraint impacts will equal zero. For example, as shown in FIG. 4, the combined incentives for increasing the feed rate correspond to 0.4 million dollars per additional barrel. Since the feed rate constraint is not an active constraint, the converted shadow values must provide a corresponding disincentive. As shown in FIG. 4, nearly all of the disincentive (converted shadow value) corresponds to a 0.39 million dollars per additional barrel debit based on the overhead temperature limit. By contrast, the benzene overhead limit only has a 0.01 million dollar per additional barrel debit. It is noted that the similar shadow value analysis of the inlet feed temperature shows that the overhead temperature limit is the largest debit due to an active constraint.

Figure 5:
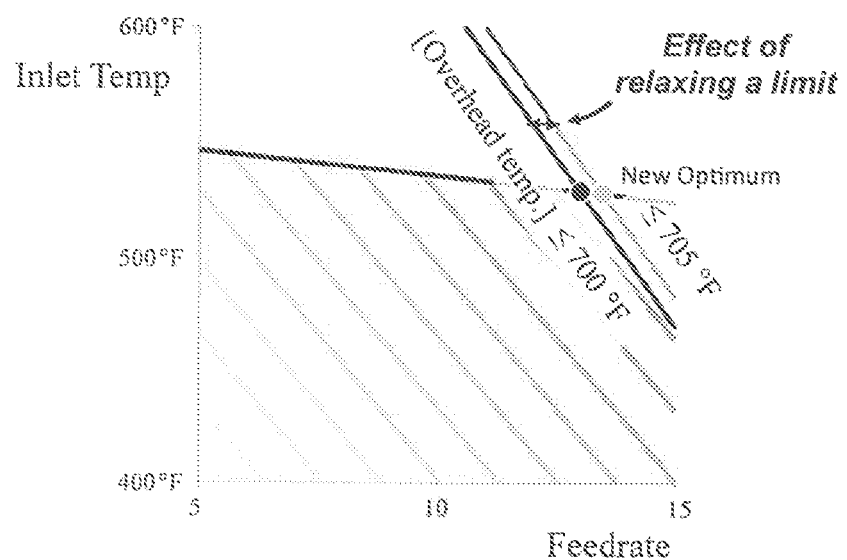

Based on the identification of overhead temperature limit as an active constraint, a user can perform further investigation of the overhead temperature limit constraint. A next step can be using the constraint sensitivity analysis tool to determine the impact of relaxing the overhead temperature limit constraint. FIG. 5 shows an example modifying the overhead temperature limit by a unit amount. FIG. 5 shows an example of a 5° F. relaxation to provide clarity in the graph, but a unit change can more typically correspond to 1° F. As shown in FIG. 5, relaxing this constraint translates the optimized solution point toward a higher feed rate.

FIG. 6 shows a constraint report based on modifying the overhead temperature constraint by 1° F. (i.e., a constraint sensitivity analysis). Since the optimized solution was optimized based on derivatives of the independent variables and not the constraints, the resulting profit (or debit) due to a unit change in a constraint is typically not 0. As shown in FIG. 6, relaxing the overhead temperature constraint by 1° F. results in increased profit of 2.49, increased feed cost of 2.43, and increased utilities of 0.02 (all in millions of dollars per day). These changed values are due to the increase in feed rate enabled by relaxing the constraint. The net result is an increase in profit of 0.34 million dollars per day. This indicates that relaxing the overhead temperature constraint, if feasible, could be a beneficial modification of how the process is operated. Note that a constraint analysis is also shown in FIG. 6 for benzene content in the overhead. As shown in FIG. 6, increasing the overhead benzene limit actually leads to a debit of 10 million dollars per day based on increased utility requirements. (The values of feed and products balance each other.)

Based on the potential favorability of increasing the overhead temperature, the next question is how much the temperature can be raised until another constraint becomes active, which can be referred to as a constraint relaxation depth analysis. This can be investigated using a constraint relaxation tool. As shown in FIG. 7, the overhead temperature can be increased by 10° F. before the next constraint becomes active. In this example, the next constraint is a content of $C_3$ compounds in the bottoms fraction.

The combination of FIGS. 1-7 shows the value of the analysis tools for analyzing an optimized solution. Shadow value analysis allows the constraints corresponding to the largest converted shadow values to be identified. The impact of modifying a constraint can then be investigated to determine if the modification is favorable. Finally, the constraint can be relaxed, optionally until another constraint becomes active, in order to determine the amount of constraint relaxation that might be beneficial.

FIGS. 12-16 provide additional details related to the hypothetical optimization illustrated in FIGS. 1-7. The additional details correspond to details showing the relationship between the underlying system, the model, and the corresponding analysis results.

Example—Applications of Analysis Tools

Figure 9:
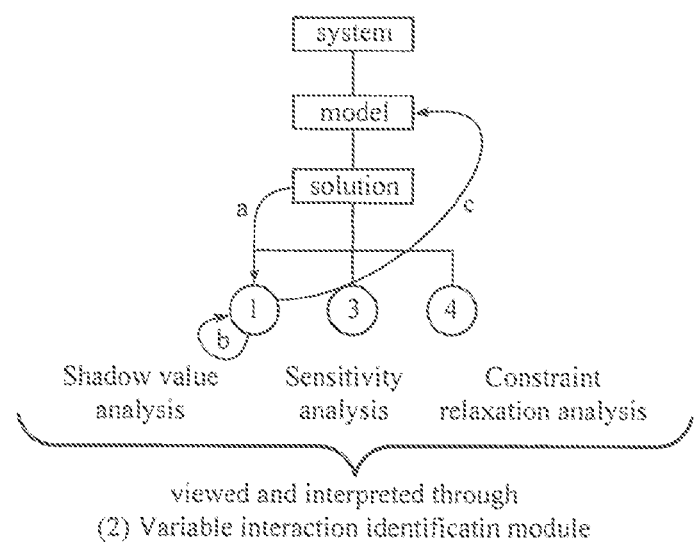
FIGS. 9-10 schematically show examples of application of the methods described herein.
Figure 10:
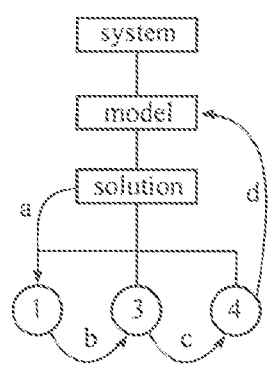

FIGS. 9-10 demonstrate various potential applications of the analysis tools. FIG. 9 shows an example of using the shadow value analysis to identify an error and/or an otherwise undesired interaction between variables in the model. After an optimized solution is found for a model of a system, stream tracking is used to identify variables that are linked for each shadow values. Based on stream tracking, one or more variables (dependent or independent) may be identified as linked even though the variables should not interact in the underlying physical system. The user interface can then be used to display the identified variables side by side. Depending on the nature of the link, this can indicate an error in the model that should be corrected.

FIG. 10 shows an example of improving hydrocarbon processing facility operation based on analysis of an optimized solution. After an optimized solution is found for a model of a system, shadow value analysis can be used to identify large converted shadow values. Stream tracking can be used to identify other constraints related to the stream(s) with the large converted shadow values. Based on the converted shadow values including the converted shadow values identified by stream tracking), constraint sensitivity analysis can be performed on the constraints contributing to the large converted shadow values. Constraints with a potentially favorable sensitivity to change can be further investigated to identify potential changes to the operation of the underlying system.

Figure 11:
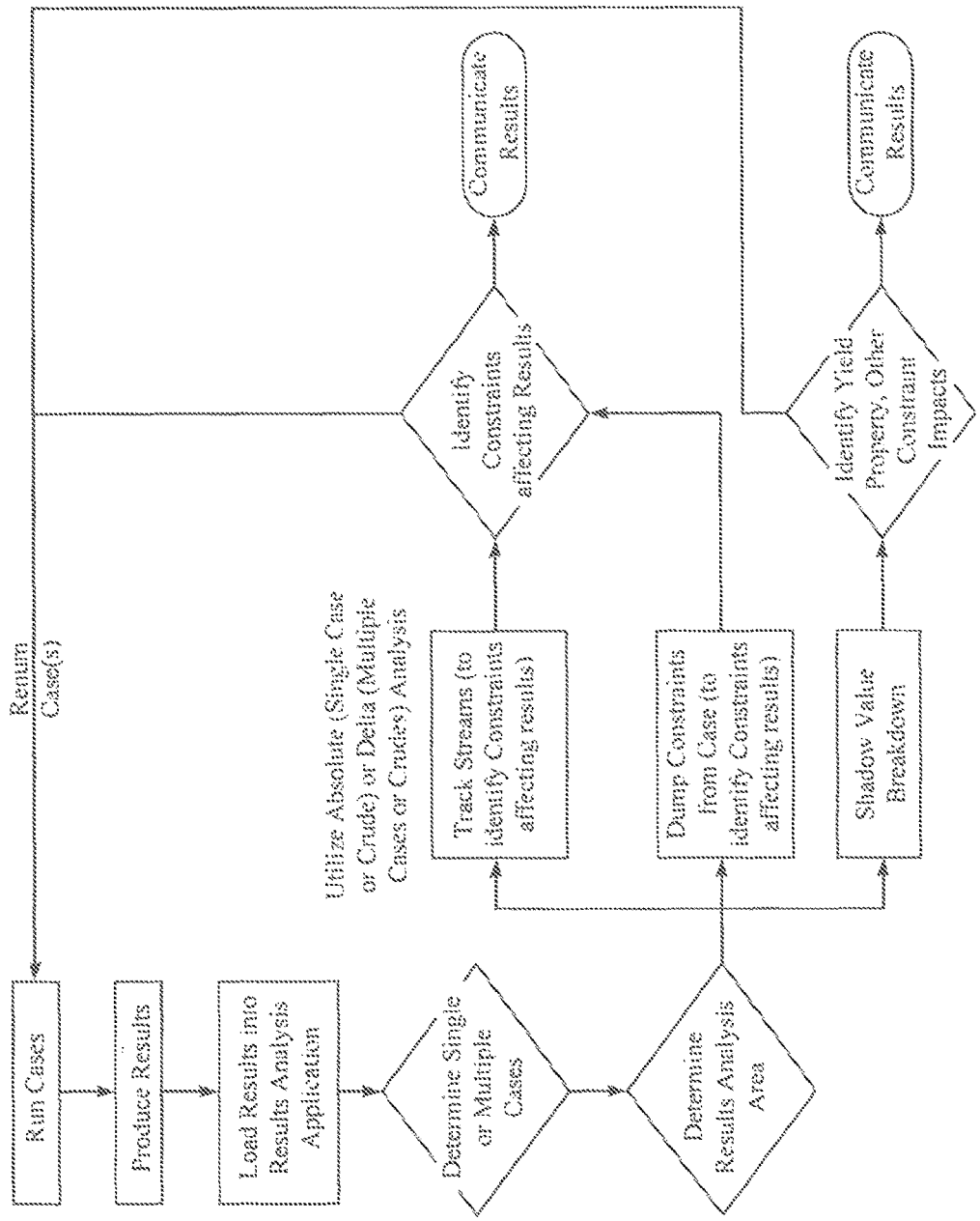
FIG. 11 shows an example of a process flow for using the methods described herein.

FIG. 11 shows an example of a process flow for implementing an optimized solution for a hydrocarbon processing system, such as a refinery or a refinery process. In FIG. 11, one or more objective functions are developed and optimized 1110 to develop an optimized solution 1115 for each objective function. The optimized solution (and optionally other values calculated during determination of the optimized solution) are then loaded 1120 into analysis tools as described herein. After determining 1122 if a single or multiple optimized solutions are provided, a results analysis area 1124 can be determined.

Three types of analysis can then be performed on the optimized solution(s). One type of analysis can involve tracking streams 1132 to identify constraints that impact the results in the optimized solution(s). Another type of analysis can involve relaxing or removing constraints 1134, to determine how the solution changes when the optimized solution is allowed to relax to the next constraint. Based on identification 1142 of one or more constraints that impact results, the results can be communicated 1151 to a user. Additionally, if desired a case or cases can be re-run based on the sensitivity of the constraints. Such additional runs can correspond to determining another optimized solution, or a partial solution can be determined for a portion of an objective function can be determined.

Still another type of analysis can involve shadow value breakdown 1136. Shadow value breakdown 1146 can assign a value to inputs, outputs (including output properties), processes, and any other elements in a model to facilitate user understanding of the refinery and/or chemical processing represented by the model. The results from shadow value breakdown 1153 can be reported to a user. Optionally, additional objective functions can be optimized based on the shadow value breakdown results.

As discussed above, the analyses may be used to identify redundant or parallel constraints. It may also be used for near, medium and long term project definition.

Optimality Conditions

The first-order KKT (Karush-Kuhn-Tucker) conditions are necessary to prove optimality for nonlinear programming problems. For unconstrained optimization, these are as simple as setting the first derivative of the objective with respect to the independent variables to zero. For constrained optimization, this involves defining an augmented Lagrange function that penalizes the objective by constraint violations weighted by their shadow value. Once this is defined, the first derivative of the Lagrange with respect to the independent variables is set to zero.

Compact Form: First, the Lagrange function, L(x, λ) can be defined, as in Equation (8). The first derivative of the Lagrange function can then be set to zero, as in Equation (9).

$$L(x, \lambda) = F(x) - \lambda^{ind,lo}(x - x^{lo}) - \lambda^{ind,up}(x - x^{up}) - \lambda^{dep,lo}(z(x) - z^{lo}) - \lambda^{dep,up}(z(x) - z^{up}) \quad (9)$$

$$\nabla_x L(x, \lambda) = 0 \quad (10)$$

For Equations (9) and (10), the shadow values are defined for each constraint as follows:

| Variable | Limit type | Shadow value | Constraint | Range |
|---|---|---|---|---|
| Independent, x | Lower | $\lambda^{ind,lo}$ | $x - x^{lo} \geq 0$ | $\lambda^{ind,lo} \leq 0$ |
| Independent, x | Upper | $\lambda^{ind,up}$ | $x - x^{up} \leq 0$ | $\lambda^{ind,up} \geq 0$ |
| Dependent, x | Lower | $\lambda^{dep,lo}$ | $z(x) - x^{lo} \geq 0$ | $\lambda^{dep,lo} \leq 0$ |
| Dependent, x | Upper | $\lambda^{dep,up}$ | $z(x) - x^{up} \leq 0$ | $\lambda^{dep,up} \geq 0$ |

Expanded form: The first derivative of the Lagrange function (9) can be simplified as:

$$L(x, \lambda) = \sum_{k=1}^{n_{obj}} f_k(x) - \sum_{i=1}^{n_{ind}} \lambda_i^{ind,lo}(x_i - x_i^{lo}) + \lambda_i^{ind,up}(x_i - x_i^{up}) - \sum_{j=1}^{n_{dep}} \lambda_j^{dep,lo}(z_j(x) - z_j^{lo}) + \lambda_j^{dep,up}(z_j(x) - z_j^{up}) \quad (11)$$

$$\nabla_{xi} L(x, \lambda) = \sum_{k=1}^{n_{obj}} \nabla_{xi} f_k(x) - \sum_{i=1}^{n_{ind}} (\lambda_i^{ind,lo} + \lambda_i^{ind,up}) - \sum_{j=1}^{n_{dep}} (\lambda_j^{dep,lo} + \lambda_j^{dep,up}) \nabla_{xi} z_j(x) = 0 \quad i = 1, 2, \ldots, n_{ind} \quad (12)$$

Reduced Costs: A reduced cost is the value of increasing a variable by one unit. The sum of the reduced cost and the initial price or objective coefficient for a variable can be interpreted as 'the amount another unit of the variable is worth'. This value is zero if the variable is not actively bounded and can be non-zero otherwise. Reduced costs are used as necessary optimality conditions in linear programming.

Reduced costs are, primarily, a linear programming concept. They can be defined in terms of a linear programming problem (compact form).

$$\max_x c^T x \quad (13)$$
$$\text{s.t. } Ax = b$$
$$x^{lo} \leq x \leq x^{up}$$

Here all of the variables are grouped into x. The basic and nonbasic nature of the variables will change throughout a linear programming solve. This may not be true the dependent/independent nature of the variables in a non-linear programming problem, such as solving the Lagrange functions shown above. A rough (although incomplete) analogy is that the basic variables are "dependent variables" and the nonbasic variables are "independent variables". The incomplete nature of this analogy leads, in part, to the incomplete analogy between first-order KKT conditions and reduced costs.

Reduced Costs (Compact Form):

$$r = c - A^T \upsilon \quad (14)$$

where $\upsilon$ are the shadow values on the equality constraints $Ax = b$.

In expanded form, Equations (13) and (14) can be expressed:

$$\max_x \sum_{i=1}^{n_{var}} c_i x_i \quad (15)$$

$$\text{s.t. } \sum_{i=1}^{n_{var}} a_{ij} x_i = b_j \quad j = 1, 2, \ldots, n_{cons}$$

$$x_i^{lo} \leq x_i \leq x_i^{up} \quad i = 1, 2, \ldots, n_{var}$$

$$r_i = c_i - \sum_{j=1}^{n_{var}} a_{ij} \upsilon_j \quad i = 1, 2, \ldots, n_{vars} \quad (16)$$

Additional Embodiments

Embodiment 1. A method for analyzing a solution from a hydrocarbon processing model comprising: generating converted shadow values from an optimized solution for an objective function of a hydrocarbon processing model; displaying a plurality of the converted shadow values; tracking a stream corresponding to at least one displayed converted shadow value to identify related converted shadow values, at least one related converted shadow value being different from the displayed plurality of converted shadow values; displaying one or more identified related converted shadow values; performing sensitivity analysis for an active constraint corresponding to at least one converted shadow value from the displayed plurality of converted shadow values or the identified related converted shadow values; performing constraint relaxation for the active constraint corresponding to the at least one converted shadow value to generate a relaxed optimized solution; and displaying at least one converted shadow value corresponding to the optimized solution and at least one converted shadow value corresponding to the relaxed optimized solution.

Embodiment 2. A hydrocarbon processing analysis system comprising: a shadow value analyzer for determining converted shadow values based on shadow values and corresponding constraint sensitivities for a plurality of constraints from an optimized solution based on a hydrocarbon processing model; a constraint sensitivity analyzer for determining changes in the optimized solution based on changes in constraint sensitivities for one or more active constraints from the plurality of constraints; a constraint relaxation module for identifying at least one of i) a secondary constraint that becomes an active constraint upon relaxation of a first active constraint from the plurality of constraints and ii) a change in the optimized solution based on a substantial change in a constraint sensitivity for an active constraint from the plurality of constraints; a stream tracker for identifying converted shadow values in the hydrocarbon processing model that are related to a process stream; and a user interface for display of at least one of: a listing of a plurality of selected converted shadow values within the determined converted shadow values, the plurality of selected converted shadow values including a) at least one converted shadow value having a value greater than a first threshold percentage of a sum of the determined converted shadow values, b) at least one converted shadow value having an absolute value greater than a second threshold percentage of the determined converted shadow values, or c) a combination thereof; a listing of converted shadow values related to a tracked process stream, the tracked process stream comprising at least one product; and a listing of converted shadow values related to a selected constraint from multiple optimized solutions.

Embodiment 3. A hydrocarbon processing analysis system comprising: a shadow value analyzer for determining converted shadow values based on shadow values and corresponding constraint sensitivities for a plurality of constraints from an optimized solution based on a hydrocarbon processing model; and a user interface for display of at least one of: a listing of a plurality of selected converted shadow values within the determined converted shadow values, the plurality of selected converted shadow values including a) at least one converted shadow value having a value greater than a first threshold percentage of a sum of the determined converted shadow values, b) at least one converted shadow value having an absolute value greater than a second threshold percentage of the determined converted shadow values, or c) a combination thereof; a listing of converted shadow values related to a tracked process stream, the tracked process stream comprising at least one product; and a listing of converted shadow values related to a selected constraint from multiple optimized solutions.

Embodiment 4. The hydrocarbon processing analysis system of Embodiment 3, further comprising a constraint relaxation module for identifying at least one of i) a secondary constraint that becomes an active constraint upon relaxation of a first active constraint from the plurality of constraints and ii) a change in the optimized solution based on a substantial change in a constraint sensitivity for an active constraint from the plurality of constraints.

Embodiment 5. The hydrocarbon processing analysis system of Embodiment 3 or 4, further comprising a stream tracker for identifying processing elements in the hydrocarbon processing model that are related to a process stream.

Embodiment 6. A method for analyzing a solution from a hydrocarbon processing model comprising: generating converted shadow values from an optimized solution for an objective function of a hydrocarbon processing model; displaying a plurality of the converted shadow values; performing constraint relaxation for an active constraint corresponding to at least one converted shadow value to generate a relaxed optimized solution; and displaying at least one converted shadow value corresponding to the optimized solution and at least one converted shadow value corresponding to the relaxed optimized solution.

Embodiment 7. The method of Embodiment 6, further comprising tracking a stream corresponding to at least one displayed converted shadow value to identify related converted shadow values, at least one related converted shadow value being different from the displayed plurality of converted shadow values.

Embodiment 8. The method or system of any of the above embodiments, wherein at least one related converted shadow value comprises a converted shadow value for an independent variable, at least one displayed converted shadow value and the at least one related converted shadow value being unrelated in the underlying hydrocarbon processing system corresponding to the hydrocarbon processing model.

Embodiment 9. The method or system of any of the above embodiments, wherein the sensitivity analysis is performed for a plurality of active constraints.

Embodiment 10. The method or system of any of the above embodiments, wherein one or more results from the sensitivity analysis are displayed, one or more results from constraint relaxation are displayed, or a combination thereof.

Embodiment 11. The method of any of Embodiments 1 or 6-10, wherein the plurality of converted shadow values and the one or more related converted shadow values are displayed in a user interface.

Embodiment 12. The method or system of any of the above embodiments, wherein the hydrocarbon processing model comprises a real-time optimization model, an ORM model, or a combination thereof.

Embodiment 13. The method or system of any of the above embodiments, wherein the hydrocarbon processing model comprises a model of a refinery, a refinery process, a chemical processing plant, a process in a chemical processing plant, or a combination thereof.

Embodiment 14. The method or system of any of the above embodiments, wherein the active constraint corresponding to the at least one converted shadow value comprises a product property constraint, a product yield constraint, or a combination thereof.

Embodiment 15. The method or system of any of the above embodiments, wherein tracking a stream comprises tracking at least one stream related to each displayed converted shadow value.

Embodiment 16. The method or system of any of the above embodiments, wherein tracking a stream comprises: selecting a stream comprising a feed stream or a distillation stream formed from the feed stream; identifying a plurality of constraints located downstream in a process flow from the selected stream; and identifying related converted shadow values corresponding to the plurality of constraints located downstream in the process flow Embodiment 17. The method of any of Embodiments 1 or 6-16, wherein displaying a plurality of the converted shadow values comprises displaying a listing of a plurality of selected converted shadow values within the determined converted shadow values, the plurality of selected converted shadow values including a) at least one converted shadow value having a value greater than a first threshold percentage of a sum of the determined converted shadow values, b) at least one converted shadow value having an absolute value greater than a second threshold percentage of the determined converted shadow values, or c) a combination thereof.

Embodiment 18. The method of any of Embodiments 1 or 6-17, further comprising displaying at least one converted shadow value corresponding to the optimized solution and at least one converted shadow value corresponding to a second optimized solution, the second optimized solution being based on a different hydrocarbon processing model.

Embodiment 19. The method of Embodiment 18, wherein the second optimized solution is based on a second hydrocarbon processing model corresponding to the hydrocarbon processing model with at least one constraint removed.

Although the present invention has been described in terms of specific embodiments, it is not so limited. Suitable alterations/modifications for operation under specific conditions should be apparent to those skilled in the art. It is therefore intended that the following claims be interpreted as covering all such alterations/modifications as fall within the true spirit/scope of the invention.

The invention claimed is:

1. A method for analyzing a solution from a hydrocarbon processing model comprising:
 generating converted shadow values from an optimized solution for an objective function of a hydrocarbon processing model, wherein the hydrocarbon processing model comprises a model of a refinery, a refinery process, a chemical processing plant, a process in a chemical processing plant, or a combination thereof, wherein the hydrocarbon processing model includes at least one of a real-time optimization model of the refinery, the refinery process, the chemical processing plant, the process in the chemical processing plant, or a combination thereof, and an Optimizable Refinery Model ("ORM") model of the refinery, the refinery process, the chemical processing plant, the process in the chemical processing plant, or a combination thereof;

displaying a plurality of the converted shadow values, wherein displaying a plurality of the converted shadow values comprises displaying a listing of a plurality of selected converted shadow values within the determined converted shadow values, the plurality of selected converted shadow values including a) at least one converted shadow value having a value greater than a first threshold percentage of a sum of the determined converted shadow values, b) at least one converted shadow value having an absolute value greater than a second threshold percentage of the determined converted shadow values, or c) a combination thereof;

tracking a stream corresponding to at least one displayed converted shadow value to identify related converted shadow values, wherein at least one related converted shadow value being different from the displayed plurality of converted shadow values, wherein tracking a stream comprises (i) selecting a stream comprising a feed stream or a distillation stream formed from the feed stream, (ii) identifying a plurality of constraints located downstream in a process flow from the selected stream, and (iii) identifying related converted shadow values corresponding to the plurality of constraints located downstream in the process flow;

displaying one or more identified related converted shadow values;

performing sensitivity analysis for at least one active constraint corresponding to at least one converted shadow value from the displayed plurality of converted shadow values or the identified related converted shadow values, wherein the active constraint corresponding to the at least one converted shadow value comprises a product property constraint, a product yield constraint, or a combination thereof;

performing constraint relaxation for the active constraint corresponding to the at least one converted shadow value to generate a relaxed optimized solution; and displaying in a user interface at least one converted shadow value corresponding to the optimized solution and at least one converted shadow value corresponding to the relaxed optimized solution.

2. The method of claim 1, wherein the at least one related converted shadow value comprises a converted shadow value for an independent variable, at least one displayed converted shadow value and the at least one related converted shadow value being unrelated in the underlying hydrocarbon processing system corresponding to the hydrocarbon processing model.

3. The method of claim 1, wherein the sensitivity analysis is performed for a plurality of active constraints.

4. The method of claim 1, wherein one or more results from the sensitivity analysis are displayed, one or more results from constraint relaxation are displayed, or a combination thereof.

5. The method of claim 1, wherein tracking a stream comprises tracking at least one stream related to each displayed converted shadow value.

6. The method of claim 1, further comprising displaying at least one converted shadow value corresponding to the optimized solution and at least one converted shadow value corresponding to a second optimized solution, the second optimized solution being based on a different hydrocarbon processing model.

7. The method of claim 6, wherein the second optimized solution is based on a second hydrocarbon processing model corresponding to the hydrocarbon processing model with at least one constraint removed.

* * * * *